(12) United States Patent
Wen et al.

(10) Patent No.: US 8,787,370 B2
(45) Date of Patent: Jul. 22, 2014

(54) METHOD AND APPARATUS FOR TRANSMITTING PACKET SWITCH DOMAIN SERVICE DATA

(75) Inventors: Junqiang Wen, Shenzhen (CN); Yun Chen, Shenzhen (CN); Kai Chen, Shenzhen (CN); Xuesen Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 194 days.

(21) Appl. No.: 13/501,712

(22) PCT Filed: Jun. 24, 2010

(86) PCT No.: PCT/CN2010/074398
§ 371 (c)(1),
(2), (4) Date: Apr. 12, 2012

(87) PCT Pub. No.: WO2010/145578
PCT Pub. Date: Dec. 23, 2010

(65) Prior Publication Data
US 2012/0201243 A1  Aug. 9, 2012

(30) Foreign Application Priority Data

Oct. 13, 2009 (CN) .......................... 2009 1 0179830

(51) Int. Cl.
*H04L 12/56* (2006.01)
(52) U.S. Cl.
USPC ............................ 370/389; 370/338; 370/469
(58) Field of Classification Search
CPC ......... H04L 12/24; H04L 29/04; H04L 12/66; H04L 12/18; H04L 12/28; H04B 1/56; G06F 15/16
USPC ......... 370/351, 535, 272, 218, 216, 219, 220, 370/392, 263, 352, 225, 464, 329, 389, 338, 370/469; 709/228
See application file for complete search history.

(56) References Cited

U.S. PATENT DOCUMENTS

| 6,763,012 | B1 * | 7/2004 | Lord et al. .................... 370/338 |
| 7,583,661 | B2 | 9/2009 | Chaudhuri |
| 8,391,218 | B1 * | 3/2013 | Joshi et al. .................... 370/329 |
| 2007/0264997 | A1 * | 11/2007 | Chaudhary et al. ........ 455/426.1 |
| 2008/0117958 | A1 * | 5/2008 | Pattenden et al. ............. 375/222 |
| 2008/0205326 | A1 * | 8/2008 | Caradec ........................ 370/328 |
| 2010/0091661 | A1 * | 4/2010 | Cordsmeyer et al. ......... 370/241 |

FOREIGN PATENT DOCUMENTS

| CN | 1889527 A | 1/2007 |
| CN | 101483931 A | 7/2009 |
| CN | 101674308 A | 3/2010 |

OTHER PUBLICATIONS

Research of Data Transmission and Cache Technology Based Multilink Point to Point Protocol, thesis, GUO JL, Dec. 31, 2008 pp. 12-15.

* cited by examiner

*Primary Examiner* — Charles C Jiang
*Assistant Examiner* — Rose Clark
(74) *Attorney, Agent, or Firm* — Porter Wright Morris & Arthur, LLP

(57) ABSTRACT

The present invention discloses a method and an apparatus for transmitting packet switch domain service data. The method comprises: establishing a correlation between multiple services and a predetermined transmission channel, wherein the predetermined transmission channel comprises multiple links and multiple channels between a Point-to-Point Protocol (PPP) client and a PPP server; and according to the correlation, transmitting the service data of the multiple services between a service application side and a protocol side via the predetermined transmission channel. The present invention achieves PDP multi-link and can process the transmission of PS domain data in parallel.

15 Claims, 4 Drawing Sheets

METHOD AND APPARATUS FOR TRANSMITTING PACKET SWITCH DOMAIN SERVICE DATA

FIELD OF THE INVENTION

The present invention relates to communication field, and in particular to a method and an apparatus for transmitting Packet Switch (PS) domain service data.

BACKGROUND OF THE INVENTION

Currently, the 3G technology becomes more and more mature and successfully begins to operate, and the status of data service in the mobile communications field is more and more highlighted.

In the 3G network, the PS domain is generally used to carry out data service. When a data request of PS domain service is initiated by a user, the Packet Data Protocol (PDP) link firstly needs to be activated. After the activation is successful, the service application can obtain the identifier (cid) of this link and the Internet Protocol (IP) address allocated to this link by the network side, and then the data transmission can be carried out on the basis of this link.

The transmission of PS domain data is divided into two forms: IP datagram and Point-to-Point Protocol (PPP) datagram. When the service application and protocol stack communicate with each other through serial port, the point-to-point transmission mode is used, namely, the PS domain data are transmitted in the form of the PPP datagram; and when the service application and the protocol stack communicate with each other through non-serial port, the data are transmitted in the form of the IP datagram.

In the conventional art, most data transmission technologies used by the mobile terminal still use the data transmission mode of single link. With the further promotion of 3G service, the user proposes higher requirements on the data service and expects to be able to process the data service application in parallel, and at the same time also expects to send/receive data more rapidly and more conveniently. Regarding this, currently most mobile terminals use service share PDP single link mode, which does not truly achieve parallel data transmission, thus affecting the receiving/sending efficiency and the quality of the PS domain data service of the mobile terminal to a certain extent.

As to the problem in relevant art that carrying out parallel data service in the multi-service share PDP single link mode causes the receiving/sending efficiency and the quality to reduce, currently still no effective solution is proposed.

SUMMARY OF THE INVENTION

The present invention is proposed regarding the problem in relevant art that carrying out parallel data service in the multi-service share PDP single link mode causes the receiving/sending efficiency and the quality to reduce, thus the main object of the present invention is to provide a method and an apparatus for transmitting PS domain service data so as to solve at least one of the above problems.

In order to achieve the above object, a method for transmitting PS domain service data is provided according to one aspect of the present invention, which is applied in the communication process between the service application side and the protocol side through serial port.

The method for transmitting PS domain service data comprises: establishing a correlation between multiple services and a predetermined transmission channel, wherein the predetermined transmission channel comprises multiple links and multiple channels between a PPP client and a PPP server; and according to the correlation, transmitting the service data of the multiple services between the service application side and the protocol side via the predetermined transmission channel.

Further, the multiple links comprise multiple PDP links and multiple PPP links.

Further, the correlation comprises: a first correlation, used to indicate a correlation between PDP link identifiers (IDs) of the multiple PDP links and channel IDs of the multiple channels; a second correlation, used to indicate a correlation between the PDP link ID and port numbers of the multiple services; and a third correlation, used to indicate a correlation between the channel ID and the PPP link ID of the multiple PPP links.

Further, the step of transmitting the service data of the multiple services between the service application side and the protocol side via the predetermined transmission channel according to the correlation comprises: transmitting the service data of the multiple services between the service application side and the PPP client; transmitting the service data of the multiple services between the PPP client and the PPP server according to the first correlation, the second correlation and the third correlation; and transmitting the service data of the multiple services between the PPP server and the protocol side according to the first correlation and the third correlation.

Further, during the transmission process of the service data of the multiple services from the service application side to the protocol side, the step of transmitting the service data of the multiple services between the service application side and the PPP client comprises: the service application side packaging predetermined information into an Internet Protocol (IP) datagram, wherein the predetermined information comprises the port numbers of the multiple services and the service data of the multiple services; and the service application side transmitting the IP datagram to the PPP client.

Further, during the transmission process of the service data of the multiple services from the service application side to the protocol side, the step of transmitting the service data of the multiple services between the PPP client and the PPP server according to the first correlation, the second correlation and the third correlation comprises: the PPP client receiving the IP datagram and packaging the IP datagram into a PPP datagram; the PPP client determining a PDP link ID used to transmit according to the port number in the IP datagram and the second correlation; the PPP client determining a channel ID used to transmit according to the PDP link ID and the first correlation; the PPP client determining a PPP link ID used to transmit according to the channel ID and the third correlation; and the PPP client transmitting the PPP datagram to the PPP server via the PPP link identified by the PPP link ID.

Further, during the transmission process of the service data of the multiple services from the service application side to the protocol side, the step of transmitting the service data of the multiple services between the PPP server and the protocol side according to the first correlation and the third correlation comprises: the PPP server receiving the PPP datagram; the PPP server determining a channel ID used to transmit according to the PPP link ID of the PPP link which receives the PPP datagram and the third correlation; the PPP server determining a PDP link ID used to transmit according to the channel ID and the first correlation; and the PPP server transmitting the PPP datagram to the protocol side via the PDP link identified by the PDP link ID.

Further, during the transmission process of the service data of the multiple services from the protocol side to the service application side, the step of transmitting the service data of the multiple services between the PPP server and the protocol side according to the first correlation and the third correlation comprises: the protocol side sending the PPP datagram to the PPP server via the PDP link identified by the PDP link ID, wherein the PPP datagram carries the service data of the multiple services.

Further, during the transmission process of the service data of the multiple services from the protocol side to the service application side, the step of transmitting the service data of the multiple services between the PPP server and the protocol side according to the first correlation, the second correlation and the third correlation comprises: the PPP server receiving the PPP datagram; the PPP server determining a channel ID used to transmit according to the PDP link ID of the PDP link which receives the PPP datagram and the first correlation; the PPP server determining a PPP link ID used to transmit according to the channel ID and the third correlation; and the PPP server transmitting the PPP datagram to the PPP client via the PPP link identified by the PPP link ID.

Further, during the transmission process of the service data of the multiple services from the protocol side to the service application side, the step of transmitting the service data of the multiple services between the service application side and the PPP client comprises: the PPP client receiving the PPP datagram; the PPP client determining a channel ID used to transmit according to the PPP link ID of the PPP link which receives the PPP datagram and the third correlation; the PPP client determining a PDP link ID according to the channel ID and the first correlation; and the PPP client determining the port numbers of the multiple services according to the PDP link ID and the second correlation; the PPP client de-packaging the PPP datagram into an IP datagram, wherein the IP datagram carries the service data of the multiple services and the port numbers of the multiple services; the PPP client sending the IP datagram to the service application side; the service application side receives the IP datagram; and the service application side transmitting the service data of the multiple services in the IP datagram to the port indicated by the port number in the IP datagram.

Further, before establishing the correlation between the multiple services and the predetermined transmission channel, the method further comprises: establishing the predetermined transmission channel.

In order to achieve the above object, an apparatus for transmitting PS domain service data is provided according to another aspect of the present invention.

The apparatus for transmitting PS domain service data comprises: a correlation establishing module, configured to establish a correlation between multiple services and a predetermined transmission channel, wherein the predetermined transmission channel comprises multiple links and multiple channels between a PPP client and a PPP server; and a transmitting module, configured to transmit the service data of the multiple services between the service application side and the protocol side via the predetermined transmission channel according to the correlation.

By way of the present invention, a correlation between multiple services and a predetermined transmission channel is established, and communication is carried out between the service application side and the protocol side via the predetermined transmission channel according to the above correlation, which solves the problem that carrying out parallel data service in the multi-service share PDP single link mode causes the receiving/sending efficiency and the quality to reduce. The present invention achieves PDP multi-link without changing the current basic procedure of the interaction between the mobile terminals and the network and can process the transmission of PS domain data in parallel.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention. In the drawings.

DETAILED DESCRIPTION OF EMBODIMENTS

Regarding the problems in the conventional art, the embodiments of the present invention provide a solution for transmitting PS domain service data, and the processing principle of this solution is as follows: establishing a correlation between multiple services and a predetermined transmission channel, and carrying out communication between the service application side and the protocol side via the predetermined transmission channel according to the correlation. This solution is capable of achieving PDP multi-link without changing the current basic procedure of the interaction between the mobile terminals and the network and can process the transmission of PS domain data in parallel.

The present invention will be described hereinafter in detail with reference to the accompanying drawings and in conjunction with embodiments. It needs to note that the embodiments of the present application and the features in the embodiments can be combined with each other if there is no conflict.

Figure 1:
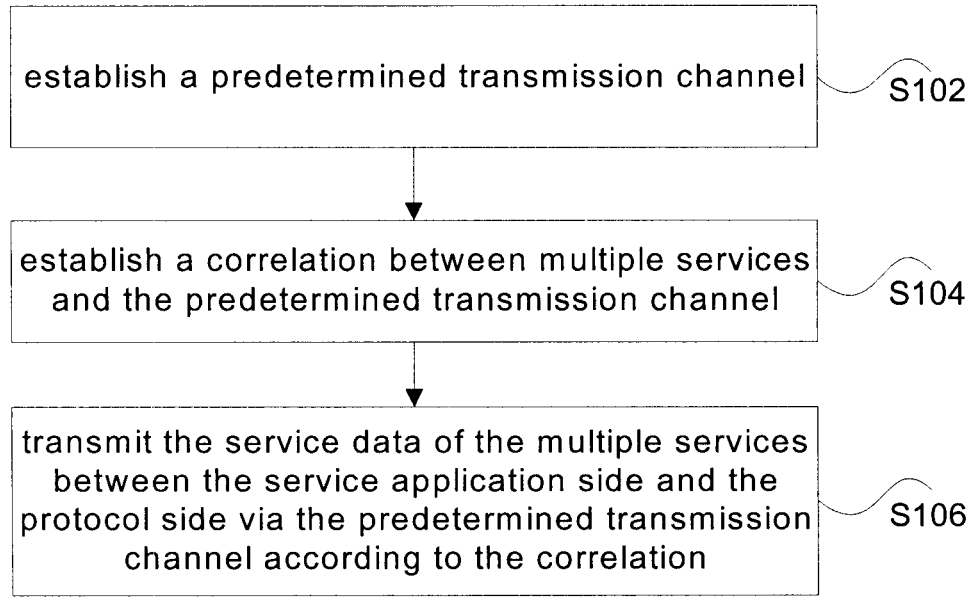
FIG. 1 is a flowchart of a method for transmitting PS domain service data according to the embodiments of the present invention.

A method for transmitting PS domain service data is provided according to the embodiments of the present invention, which is applied in the communication between the service application side and the protocol side through serial port. FIG. 1 is a flowchart of a method for transmitting PS domain service data according to the embodiments of the present invention, and as shown in FIG. 1, this method comprises the following steps S102 to S106.

Step S102, establish a predetermined transmission channel. In this step, the predetermined transmission channel comprises multiple links and multiple channels between a PPP client and a PPP server, and the above multiple links comprise multiple Packet Data Protocol (PDP) links and multiple PPP links.

Step S104, establish a correlation between multiple services and the predetermined transmission channels. The correlation comprises: a first correlation, used to indicate a correlation between the identifiers (cids) of the multiple PDP links and the channel IDs of the multiple channels; a second correlation, used to indicate a correlation between the cids and the port numbers of the multiple services; and a third correlation, used to indicate a correlation between the channel IDs and the PPP link IDs of the multiple PPP links.

Step S106, transmit the service data of the multiple services between the service application side and the protocol side via the predetermined transmission channel according to the correlation.

In relevant art, the multi-service share PDP single link mode is adopted to carry out parallel data service. In the embodiments of the present invention, the predetermined transmission channel comprises multiple links and multiple channels, which can achieve PDP multi-link, thus transmitting the PS domain data in parallel, furthermore improving the receiving/sending efficiency and the receiving/sending quality.

Step S106 comprises: communicating between the service application side and the PPP client; communicating between the PPP client and the PPP server according to the first correlation, the second correlation and the third correlation; and communicating between the PPP server and the protocol side according to the first correlation and the third correlation. It will be described in detail hereinafter:

(1) in the situation that the data of one certain service are transmitted from the service application side to the protocol side:

communicating between the service application side and the PPP client according to the correlation comprises: the service application side packaging the predetermined information into an IP datagram, wherein the predetermined information includes service port number (iport IDx) and service data; and the service application side transmitting the IP datagram to the PPP client;

communicating between the PPP client and the PPP server according to the correlation comprises: the PPP client determining a PDP link identifier (cidx) used to transmit according to the iport IDx and the second correlation, determining the channel identifier (Channel IDx) of a channel used to transmit according to the cidx and the first correlation, and determining a PPP link identifier (PPP Link IDx) used to transmit according to the Channel IDx and the third correlation; and the PPP client packaging the IP datagram into a PPP datagram and transmitting the PPP datagram to the PPP server via the PPP link with the identifier of PPP Link IDx; and communicating between the PPP server and the protocol side according to the correlation comprises: after the PPP link with the identifier of PPP Link IDx has received the PPP datagram, the PPP server determining the Channel IDx according to the PPP Link IDx and the third correlation, and determining the cidx according to the Channel IDx and the first correlation; and the PPP server transmitting the PPP datagram to the protocol side via the PDP link with the identifier of cidx.

(2) in the situation that the data of one certain service are transmitted from the protocol side to the service application side:

communicating between the PPP server and the protocol side according to the correlation comprises: the protocol side sending a PPP datagram to the PPP server via a PDP link with the identifier of cidx, wherein the PPP datagram carries the service data of one certain service; and the PPP server receiving the PPP datagram, determining the channel IDx of the channel used to transmit according to the cidx and the first correlation, and determining the PPP link identifier (PPP Link IDx) used to transmit according to the Channel IDx and the third correlation;

communicating between the PPP client and the PPP server according to the correlation comprises: the PPP server transmitting the PPP datagram to the PPP client via the PPP link with the identifier of PPP Link IDx; and the PPP client determining the Channel IDx according to the PPP Link IDx and the third correlation, determining the cidx according to the Channel IDx and the first correlation, and determining the port number (iport IDx) of one certain service according to the cidx and the second correlation; and communicating between the service application side and the PPP client according to the correlation comprises: the PPP client sending an IP datagram to the service application side, wherein the IP datagram comprises the service data of one certain service and the iport IDx; and the service application side receiving the IP datagram and transmitting the service data to the service port with the port number of iport IDx.

The implementing process of the embodiments of the present invention will be described in detail in conjunction with examples hereinafter.

Embodiment 1

Figure 2:
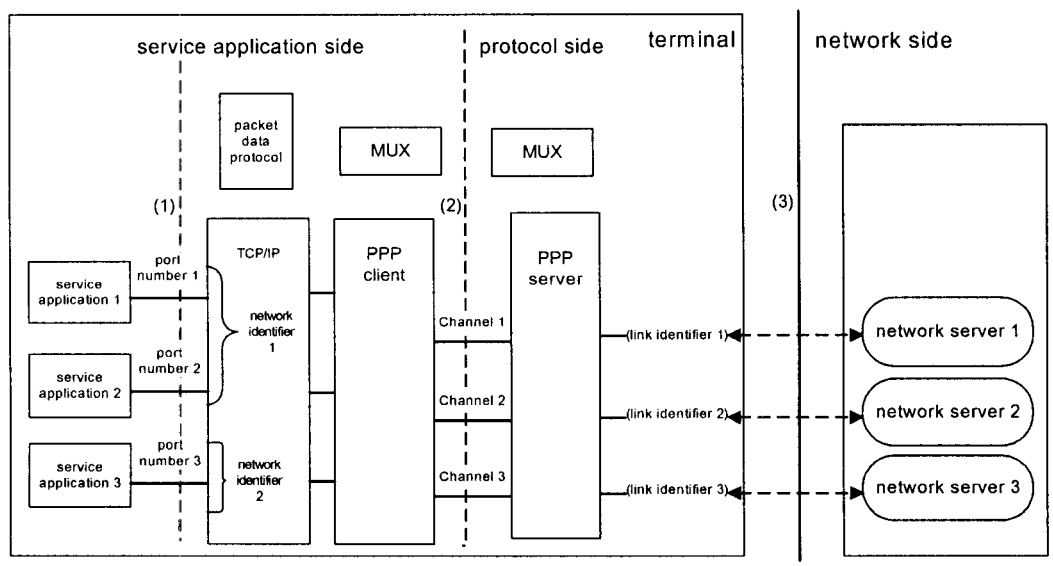
FIG. 2 is a schematic diagram of PS domain data transmission according to embodiment 1 of the present invention.

FIG. 2 is a schematic diagram of PS domain data transmission according to embodiment 1 of the present invention, and the above method for transmitting PS domain service data will be described in detail in conjunction with FIG. 2 hereinafter.

When the data are transmitted in the form of PPP datagram through serial port, the method provided by the embodiments of the present invention can achieve PDP multi-link between the service application side and the protocol side and can process the PS domain data in parallel. As to the transmission between the protocol side and the network side, both parties can transmit data over different agreed links, the principle of which is relatively simple, and the relevant art is very mature, which will not be described here unnecessarily.

However, between the service application side and the protocol side, it requires using the PPP protocol to transmit data over the serial port based on multi-channel so as to carry out point-to-point data transmission. On the service application side, it has to go through the data transmission among the service application, TCP/IP and PPP.

If the service side (namely, service application side) and the protocol side carry out data communication through a serial port, then it has to achieve multi-channel (Channel ID) over the serial port so as to support the parallel transmission of service data over the serial port. However, whether the uplink data from the service application side to the protocol side or the downlink data from the protocol side to the service application side, during its whole transmission, the recognition identifier of the data is provide so as to guide the transmission of the data.

As to protocol stack (namely, protocol side), the recognition identifier of the data is cid, while as to the service application side, the recognition identifier of the data is 'IP+iport Id'. While at the middle stage of the transmission of the data, it requires to transmit the data based on multi-channel over the serial port between the service application side and the protocol side, therefore, it needs to establish the correlation among the cid, 'IP+iport ID' and Channel ID.

The IP address is dynamically allocated for the PDP link (cid) by the network side, and the port number (iport ID) may be locally designated for this link by the terminal, namely, a one-to-one correlation may be established between the iport ID and cid, one party may be determined by the other party. In the practical application, the cid value may be directly allocated as a port number, for example, cid is 1, and then the port number allocated to this link is 1, so that it no longer needs to maintain the correlation between the cid and the iport ID.

When transmitting the PPP datagram over the multi-channel, both ends of the channel are respectively PPP client and PPP server, then each end of them needs to distinguish the PPP datagram transmitted from the other end, namely, as to the uplink data, the protocol stack needs to know by which link (cid) the PPP datagram can be transmitted to the network side, and as to the downlink data, the service application side needs to know the PPP datagram is transmitted to the service application over which port. The data over one certain link should be transferred to which service port can be indicated by the preset correlation between the cid and the Channel ID.

After the PDP link is established, when transmitting data, the PPP client and server establish a PPP link over a designated channel (Channel ID) according to the correlation between the cid and Channel ID, and then transmit the PPP datagram, furthermore, the transmitted data may also be corresponded onto a corresponding link by the PPP client and PPP server.

In this way, the relationship among the iport ID, Channel ID and cid can be associated in serial by taking the cid as the center, thus providing guide recognition for the data parallel transmission among the "service application side—>protocol side—>network side".

Embodiment 2

Figure 3:
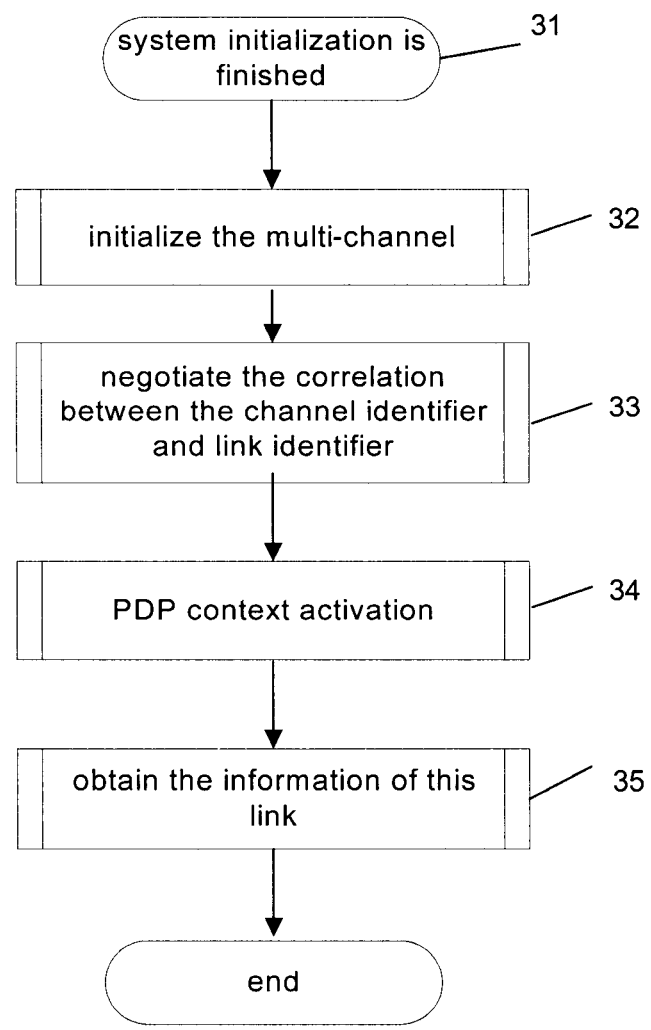
FIG. 3 is a flowchart of the process of PDP link activation and multi-channel initialization according to embodiment 2 of the present invention.
Figure 4:
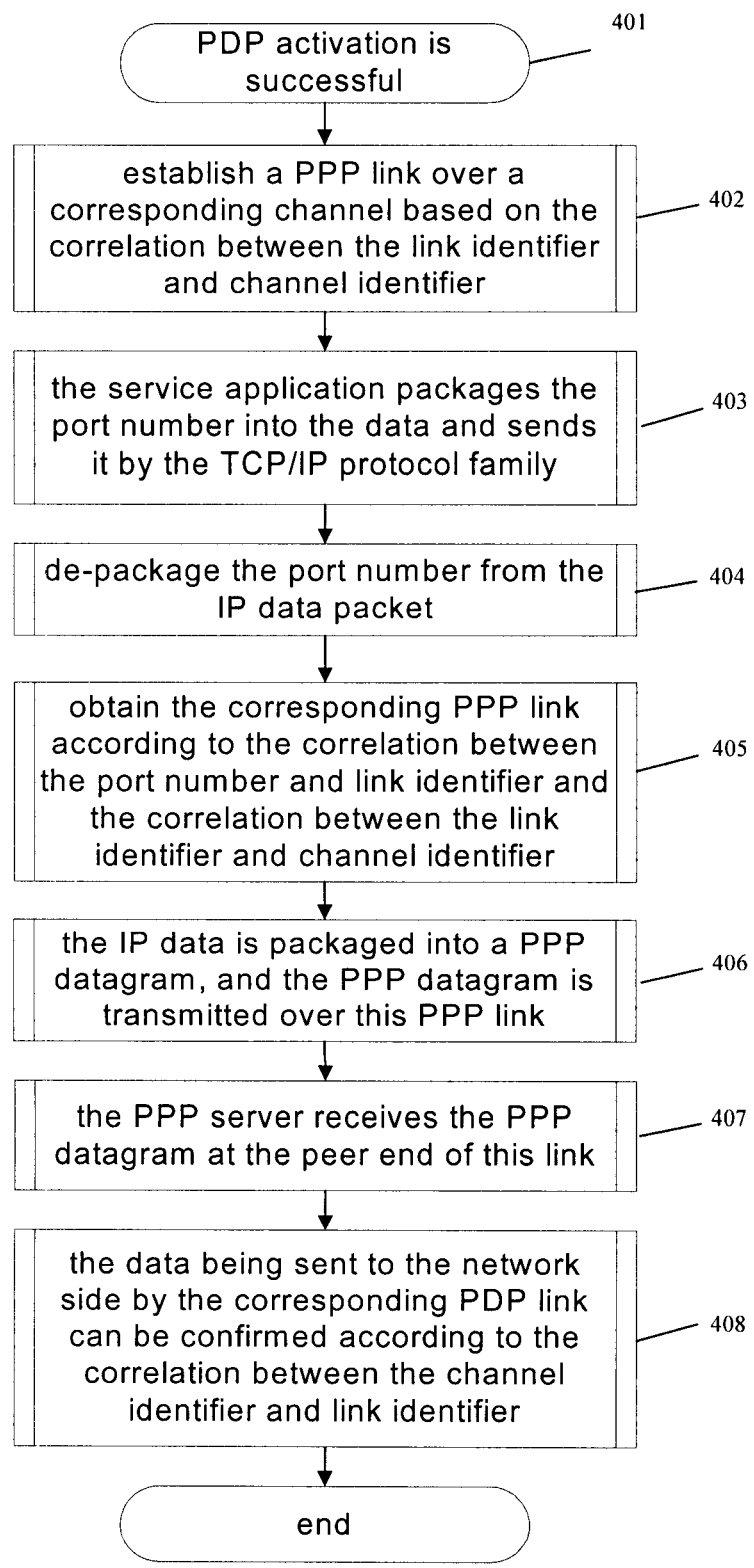
FIG. 4 is a flowchart of the data transmission process from the service application side to the network side after the PDP link activation is successful according to embodiment 2 of the present invention.

FIG. 3 is a flowchart of the process of PDP link activation and multi-channel initialization according to embodiment 2 of the present invention and FIG. 4 is a flowchart of the data transmission process from the service application side to the network side after the PDP link activation is successful according to embodiment 2 of the present invention, and the method provided by the embodiments of the present invention will be described in detail in conjunction with FIGS. 3 and 4.

Step 401: the process of multi-channel initialization and PDP link activation is performed, during which the correlation between the Channel ID and cid is negotiated. The particular process comprises the following steps 31 to 35.

Step 31: a mobile terminal starts up and finishes system initialization.

Step 32: the service application side and protocol side initialize the multi-channel by MUX.

Step 33: the service application side and protocol side negotiate the correlation between the Channel ID and cid each other, for example, cid1 corresponds to Channel ID1 and cid2 corresponds to Channel ID2. This correlation may be pre-stored in the mobile phone in the form of file, and the negotiation process is that the service application side and protocol side respectively read the correlation information in this file; this correlation can also be stored in a global variable of the service application side, and the negotiation process is that the service application side sends this correlation information to the protocol side in the form of extended AT or message, or the service application side sends this correlation to the protocol side by specific information. It needs to note that, in order to make the implementation of this example clearer, the negotiation of the correlation is described using two particular negotiation methods in this example, and during the practical application, the available negotiation method is not limited to the above two methods.

Step 34: service application 1 initiates a PDP link activation request.

Step 35: after the activation is successful, assuming that the identifier of this link is cid1, then the port number of iport ID1 is allocated for this PDP link. In this step, it requires to establish and maintain the correlation between the cid and iport ID.

Step 402: the Channel ID1 is switched to data state according to the agreed correlation between the cid and Channel ID in Step 35 (in this embodiment, cid1 corresponds to Channel ID1), and the PPP client on the service application side and the PPP server on the protocol side establish a PPP link over this channel (namely, Channel ID1), wherein the number of the PPP link (in this embodiment, link number is used as the identifier of the PPP link) is PPP Link ID1. In this step, the service application side and the protocol side respectively establish and maintain the correlation between the Channel ID and PPP Link ID so as to transmit the PPP datagram. The service application side notifies the service application 1 that the link of service application side has been established successfully (PDP link number is cid1 and port number is iport ID1) and the data transmission may be carried out.

Step 403: the service application 1 packages its port number iport ID1 with the data to be transmitted into an IP datagram, and transmit the IP datagram by the TCP/IP protocol family.

Step 404: the port number of iport ID1 can be obtained from the IP datagram outputted by the TCP/IP protocol family, and this IP datagram is to be transmitted by the PDP link with the link number of cid1 can be known according to the correlation between the iport ID and cid maintained in Step 35.

Step 405: the link number corresponding to the corresponding PPP link being PPPLink ID1 is determined according to the agreed correlation between the cid and Channel ID in Step 33 and the correlation between the Channel ID and PPP Link ID maintained in Step 402.

Step 406: this IP datagram is further packaged into a PPP datagram, and the PPP datagram is transmitted over the PPP link with the link number of PPP Link ID1 established in Step 402.

Step 407: the PPP server on the protocol side receives data at the peer end of the link with the link number of PPP Link ID1.

Step 408: this PPP datagram should be sent to the network side by the PDP link with the link number of cid1 can be determined according to the correlation between the Channel ID and PPP Link ID maintained in Step 402 and the agreed correlation between the cid and Channel ID in Step 33.

Provided that during the data transmission of service application 1, service application 2 also initiates a data transmission request, then the process from steps 34, 35, 402 to 408 are also repeated, for example, in the above process, the PDP link number corresponding to the service application 2 is cid2, the corresponding port number is iport ID2, the corresponding channel number is Channel ID2, the link number of the established PPP link is PPP Link ID2. By way of the above process, the data parallel transmission of the service application 1 and service application 2 can be achieved.

Embodiment 2 describes the situation that the service data is transmitted from the service application side to the protocol side and then is transmitted to the network side in detail, and the principle of the transmission procedure of transmission in the reverse direction is identical thereto, which will not be described here unnecessarily.

It needs to note that the step shown in the flowcharts of the drawings can be executed in a computer system such as a set of computer executable instructions, and although the logical order is shown in the flowcharts, the steps shown or described here can be executed in an order different from this in some circumstances.

Figure 5:
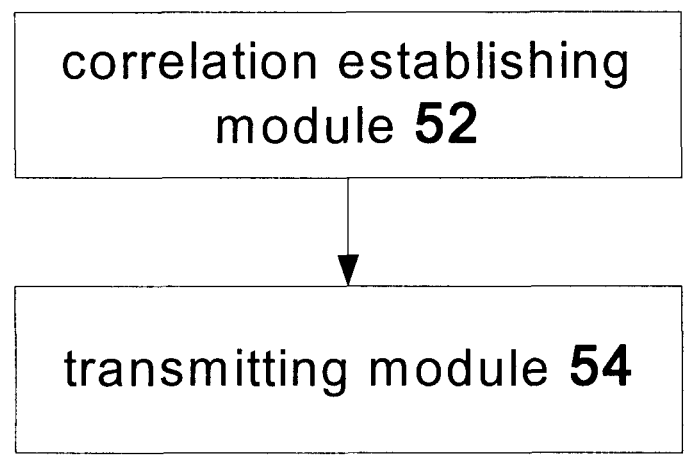
FIG. 5 is a structural block diagram of an apparatus for transmitting PS domain service data according to the embodiments of the present invention.

An apparatus for transmitting PS domain service data is provided according to the embodiments of the present invention, and FIG. 5 is a structural block diagram of an apparatus for transmitting PS domain service data according to the embodiments of the present invention. As shown in FIG. 5, this apparatus comprises:

a correlation establishing module 52, configured to establish a correlation between multiple services and a predetermined transmission channel, wherein the predetermined transmission channel comprises multiple links and multiple channels between PPP client and PPP server, in which the above multiple links comprise multiple PDP links and multiple PPP links, and the above correlation comprises a first correlation for indicating a correlation between the identifiers (cids) of the multiple PDP links and the channel identifiers (Channel IDs) of the multiple channels, a second correlation for indicating a correlation between the cids and the port numbers of the multiple services, and a third correlation for indicating a correlation between the channel identifier and the identifier (PPP Link ID) of the multiple PPP links; and a transmitting module 54, connected to the correlation establishing module 52, configured to transmit the service data of the multiple services between the service application side and the protocol side via the predetermined transmission channel according to the correlation. Preferably, the transmitting module 54 is configured to communicate between the service application side and the PPP client, to communicate between the PPP client and the PPP server according to the first correlation, the second correlation and the third correlation, and to transmit the service data of the multiple services between the service application side and the protocol side according to the first correlation and the third correlation.

Preferably, the above apparatus may further comprise: a transmission channel establishing module for establishing a predetermined transmission channel.

It needs to note that the correlation in the embodiments of the present invention can be a one-to-one correlation and can also be one-to-multiple relationship or multiple-to-one relationship, and the implementation of this solution is the same, which will not be described here unnecessarily.

In summary, according with the solution for transmitting PS domain service data, PDP multi-link can be achieved and the PS domain data transmission can be processed in parallel without changing the current basic procedure of the interaction between the mobile terminal and the network.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

Above description is only to illustrate the preferred embodiments but not to limit the present invention. Various alternations and changes to the present invention are apparent to those skilled in the art. The scope defined in claims shall cover any medication, equivalent substitution and improvement within the spirit and principle of the present invention.

What is claimed is:

1. A method for transmitting Packet Switch (PS) domain service data, being applied in the service data transmission process between a service application side and a protocol side through serial port, and comprising:

establishing a correlation between multiple services and a predetermined transmission channel, wherein the predetermined transmission channel comprises multiple links and multiple channels between a Point-to-Point Protocol (PPP) client and a PPP server; and according to the correlation, transmitting the service data of the multiple services between the service application side and the protocol side via the predetermined transmission channel:

wherein the multiple links comprise multiple Packet Data Protocol (PDP) links and multiple PPP links, and the correlation comprises:

a first correlation, used to indicate a correlation between PDP link identifiers (IDs) of the multiple PDP links and channel identifiers (IDs) of the multiple channels;

a second correlation, used to indicate a correlation between the PDP link ID and port numbers of the multiple services; and a third correlation, used to indicate a correlation between the channel ID and the PPP link identifiers (IDs) of the multiple PPP links;

wherein the step of transmitting the service data of the multiple services between the service application side and the protocol side via the predetermined transmission channel according to the correlation comprises:

transmitting the service data of the multiple services between the service application side and the PPP client;

transmitting the service data of the multiple services between the PPP client and the PPP server according to the first correlation, the second correlation and the third correlation; and transmitting the service data of the multiple services between the PPP server and the protocol side according to the first correlation and the third correlation.

2. The method according to claim 1, wherein before establishing the correlation between the multiple services and the predetermined transmission channel, the method further comprises: establishing the predetermined transmission channel.

3. The method according to claim 1, wherein during the transmission process of the service data of the multiple services from the service application side to the protocol side, the step of transmitting the service data of the multiple services between the service application side and the PPP client comprises:

the service application side packaging predetermined information into an Internet Protocol (IP) datagram, wherein the predetermined information comprises the port numbers of the multiple services and the service data of the multiple services; and the service application side transmitting the IP datagram to the PPP client.

4. The method according to claim 3, wherein before establishing the correlation between the multiple services and the predetermined transmission channel, the method further comprises: establishing the predetermined transmission channel.

5. The method according to claim 1, wherein during the transmission process of the service data of the multiple services from the service application side to the protocol side, the step of transmitting the service data of the multiple services between the service application side and the PPP server according to the first correlation, the second correlation and the third correlation comprises:

the PPP client receiving the IP datagram and packaging the IP datagram into a PPP datagram;

the PPP client determining a PDP link identifier used to transmit according to the port number in the IP datagram and the second correlation;

the PPP client determining a channel ID used to transmit according to the PDP link ID and the first correlation;

the PPP client determining a PPP link identifier used to transmit according to the channel ID and the third correlation; and the PPP client transmitting the PPP datagram to the PPP server via the PPP link identified by the PPP link ID.

6. The method according to claim 5, wherein before establishing the correlation between the multiple services and the predetermined transmission channel, the method further comprises: establishing the predetermined transmission channel.

7. The method according to claim 1, wherein during the transmission process of the service data of the multiple services from the service application side to the protocol side, the step of transmitting the service data of the multiple services between the PPP server and the protocol side according to the first correlation and the third correlation comprises:

the PPP server receiving the PPP datagram;

the PPP server determining a channel ID used to transmit according to the PPP link ID of the PPP link which receives the PPP datagram and the third correlation;

the PPP server determining a PDP link ID used to transmit according to the channel ID and the first correlation; and the PPP server transmitting the PPP datagram to the protocol side via the PDP link identified by the PDP link ID.

8. The method according to claim 7, wherein before establishing the correlation between the multiple services and the predetermined transmission channel, the method further comprises: establishing the predetermined transmission channel.

9. The method according to claim 1, wherein during the transmission process of the service data of the multiple services from the protocol side to the service application side, the step of transmitting the service data of the multiple services between the PPP server and the protocol side according to the first correlation and the third correlation comprises:

the protocol side sending the PPP datagram to the PPP server via the PDP link identified by the PDP link ID, wherein the PPP datagram carries the service data of the multiple services.

10. The method according to claim 9, wherein before establishing the correlation between the multiple services and the predetermined transmission channel, the method further comprises: establishing the predetermined transmission channel.

11. The method according to claim 1, wherein during the transmission process of the service data of the multiple services from the protocol side to the service application side, the step of transmitting the service data of the multiple services between the PPP client and the PPP server according to the first correlation, the second correlation and the third correlation comprises:

the PPP server receiving the PPP datagram;

the PPP server determining a channel ID used to transmit according to the PDP link ID of the PDP link which receives the PPP datagram and the first correlation;

the PPP server determining a PPP link ID used to transmit according to the channel ID and the third correlation; and the PPP server transmitting the PPP datagram to the PPP client via the PPP link identified by the PPP link ID.

12. The method according to claim 11, wherein before establishing the correlation between the multiple services and the predetermined transmission channel, the method further comprises: establishing the predetermined transmission channel.

13. The method according to claim 1, wherein during the transmission process of the service data of the multiple services from the protocol side to the service application side, the step of transmitting the service data of the multiple services between the service application side and the PPP client comprises:

the PPP client receiving the PPP datagram;

the PPP client determining a channel ID used to transmit according to the PPP link ID of the PPP link which receives the PPP datagram and the third correlation;

the PPP client determining a PDP link ID according to the channel ID and the first correlation;

the PPP client determining port numbers of the multiple services according to the PDP link ID and the second correlation;

the PPP client de-packaging the PPP datagram into an IP datagram, wherein the IP datagram carries the service data of the multiple services and the port numbers of the multiple services;

the PPP client sending the IP datagram to the service application side;

the service application side receiving the IP datagram; and the service application side transmitting the service data of the multiple services in the IP datagram to a port indicated by the port number in the IP datagram.

14. The method according to claim 13, wherein before establishing the correlation between the multiple services and the predetermined transmission channel, the method further comprises: establishing the predetermined transmission channel.

15. An apparatus for transmitting Packet Switch (PS) domain service data, comprising:

a correlation establishing module, configured to establish a correlation between multiple services and a predetermined transmission channel, wherein the predetermined transmission channel comprises multiple links and multiple channels between a Point-to-Point Protocol (PPP) client and a PPP server, wherein the multiple links comprise multiple Packet Data Protocol (PDP) links and multiple PPP links, and the correlation comprises: a first correlation, used to indicate a correlation between PDP link identifiers (IDs) of the multiple PDP links and channel identifiers (IDs) of the multiple channels; a second correlation, used to indicate a correlation between the PDP link ID and port numbers of the multiple services; and a third correlation, used to indicate a correlation between the channel ID and the PPP link identifiers (IDs) of the multiple PPP links; and a transmitting module, configured to transmit the service data of the multiple services between a service application side and a protocol side via the predetermined transmission channel according to the correlation:, wherein the transmitting module is further configured to transmit the service data of the multiple services between the service application side and the PPP client, to transmit the service data of the multiple services between the PPP client and the PPP server according to the first correlation, the second correlation and the third correlation, and to transmit the service data of the multiple services between the PPP server and the protocol side according to the first correlation and the third correlation.

* * * * *